US010387749B2

(12) United States Patent
Movshovitz-Attias et al.

(10) Patent No.: US 10,387,749 B2
(45) Date of Patent: *Aug. 20, 2019

(54) DISTANCE METRIC LEARNING USING PROXIES

(71) Applicant: Google Inc., Mountain View, CA (US)

(72) Inventors: Yair Movshovitz-Attias, Mountain View, CA (US); King Hong Leung, Saratoga, CA (US); Saurabh Singh, Mountain View, CA (US); Alexander Toshev, San Francisco, CA (US); Sergey Ioffe, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,377

(22) Filed: Sep. 20, 2017

(65) Prior Publication Data
US 2019/0065899 A1 Feb. 28, 2019

Related U.S. Application Data

(63) Continuation-in-part of application No. 15/690,426, filed on Aug. 30, 2017.

(51) Int. Cl.
G06K 9/62 (2006.01)
G06N 20/00 (2019.01)
(Continued)

(52) U.S. Cl.
CPC ......... *G06K 9/6215* (2013.01); *G06K 9/4628* (2013.01); *G06K 9/6232* (2013.01);
(Continued)

(58) Field of Classification Search
CPC .. G06K 9/6215; G06K 9/6256; G06K 9/6262; G06N 99/005
See application file for complete search history.

(56) References Cited

U.S. PATENT DOCUMENTS

2011/0243381 A1* 10/2011 Tsagkatakis ......... G06K 9/6215
382/103
2012/0089551 A1* 4/2012 Ebadollahi ........... G06N 99/005
706/48
(Continued)

OTHER PUBLICATIONS

Abadi et al., Tensorflow: Large-Scale Machine Learning on Heterogeneous Distributed Systems, Mar. 14, 2016, 19 pages.
(Continued)

*Primary Examiner* — Samir A Ahmed
(74) *Attorney, Agent, or Firm* — Dority & Manning, P.A.

(57) ABSTRACT

The present disclosure provides systems and methods that enable distance metric learning using proxies. A machine-learned distance model can be trained in a proxy space in which a loss function compares an embedding provided for an anchor data point of a training dataset to a positive proxy and one or more negative proxies, where each of the positive proxy and the one or more negative proxies serve as a proxy for two or more data points included in the training dataset. Thus, each proxy can approximate a number of data points, enabling faster convergence. According to another aspect, the proxies of the proxy space can themselves be learned parameters, such that the proxies and the model are trained jointly. Thus, the present disclosure enables faster convergence (e.g., reduced training time). The present disclosure provides example experiments which demonstrate a new state of the art on several popular training datasets.

20 Claims, 9 Drawing Sheets

(51) Int. Cl.
*G06K 9/46* (2006.01)
*G06K 9/66* (2006.01)
(52) U.S. Cl.
CPC ......... *G06K 9/6255* (2013.01); *G06K 9/6256* (2013.01); *G06K 9/6262* (2013.01); *G06K 9/66* (2013.01); *G06N 20/00* (2019.01)

(56) References Cited

U.S. PATENT DOCUMENTS

| | | | | |
|---|---|---|---|---|
| 2013/0144818 | A1* | 6/2013 | Jebara | G06N 99/005 706/12 |
| 2013/0250181 | A1* | 9/2013 | Zhang | H04N 21/4223 348/734 |
| 2014/0279755 | A1* | 9/2014 | Xu | G06N 99/005 706/12 |
| 2015/0186793 | A1* | 7/2015 | Ioffe | G06N 99/005 706/12 |
| 2017/0228641 | A1* | 8/2017 | Sohn | G06F 17/11 |

OTHER PUBLICATIONS

Chopra et al., "Learning a Similarity Metric Discrimininatively, with Application to Face Verification", In Computer Vision and Pattern Recognition, Institute of Electrical and Electronics Engineers Conference, vol. 1, Jun. 20-25, 2005, San Diego, California, 8 pages.

Hadsell et al., "Dimensionality Reduction by Learning an Invariant Mapping", Computer Vision and Pattern Recognition, Institute of Electrical and Electronics Engineers Conference, vol. 2, Jun. 17-23, 2006, New York, New York, 8 pages.

Hershey et al., "Deep Clustering: Discrimininative Embeddings for Segmentation and Seperation", In Acoustics, Speech, and Signal Processing, Institute of Electrical and Electronics Engineers Conference, Mar. 20-25, 2016, Shanghai, China, 10 pages.

Ioffe et al., "Batch Normalization: Accelerating Deep Network Training by Reducing Internal Covariate Shift", Proceedings of the 32$^{nd}$ International Conference on Machine Learning, Jul. 6-11, 2015, Lille, France, 9 pages.

Krause et al., "3d Object Representations for Fine-Grained Categorization", In Proceedings of the Institute of Electrical and Electronics Engineers Conference on Computer Vision Workshops, Dec. 1-8, 2013, Sydney, Australia, pp. 554-561.

Manning et al., "Introduction to Information Retrieval", Cambridge University Press, New York, New York, May 27, 2008, 504 pages.

Oh Song et al., "Deep Metric Learning via Lifted Structured Feature Embedding", In Proceedings of the Institute of Electrical and Electronics Engineers Conference on Computer Vision and Pattern Recognition, Jun. 27-30, 2016, Seattle, Washington, pp. 4,004-4,012.

Rippel et al., "Metric Learning with Adaptive Density Discrimination", arXiv preprint arXiv:1511.05939, 2015, 15 pages.

Roweis et al., "Neighbourhood Components Analysis", In Advances in Neural Information Processing Systems, Dec. 2004, Vancouver, B.C., Canada, 8 pages.

Russakovsky et al., "Imagenet Large Scale Visual Recognition Challenge", International Journal of Computer Vision, vol. 115, No. 3, Dec. 1, 2015, 43 pages.

Schroff et al., "Facenet: A Unified Embedding for Face Recognition and Clustering", In Proceedings of the Institute of Electrical and Electronics Engineers Conference on Computer Vision and Pattern Recognition, Jun. 7-12, 2015, Boston, Massachusetts, pp. 815-823.

Schultz et al., "Learning a Distance Metric From Relative Comparisons", In Advances in Neural Information and Processing Systems, vol. 1, Dec. 5-10, 2013, Lake Tahoe, Nevada, 8 pages.

Sohn, "Improved Deep Metric Learning with Multi-Class N-Pair Loss Objective", In Advances in Neural Information and Processing Systems, Dec. 5-10, 2016, Barcelona, Spain, 9 pages.

Song et al., "Learnable Structured Clustering Framework for Deep Metric Learning", Institute of Electrical and Electronics Engineers Conference on Computer Vision and Pattern Recognition, Jul. 21-26, 2017, Hawaii, 9 pages.

Szegedy et al., "Going Deeper with Convolutions", In Proceedings of the Institute of Electrical and Electronics Engineers Conference on Computer Vision and Pattern Recognition, Jun. 7-12, 2015, Boston, Massachusetts, 9 pages.

Wah et al., "The Caltech-UCSD Birds-200-2011 Dataset", Computation & Neural Systems Technical Report, California Institute of Technology, 2011, Pasadena, California, 8 pages.

Weinberger et al., "Distance Metric Learning for Large Margin Nearest Neighbor Classification", In Advances in Neural Information Processing Systems, Dec. 4, 2006, Vancouver, B.C., Canada, 8 pages.

Zheng et al., "Improving the Robustness of Deep Neural Networks via Stability Training", In Proceedings of the Institute of Electrical and Electronics Engineers Conference on Computer Vision and Pattern Recognition, Jun. 27-30, 2016, Seattle, Washington, pp. 4,480-4,488.

International Search Report with Written Opinion for PCT/US2018/032538 dated Jul. 26, 2018, 9 pages.

Movshovitz-Attias et al., "No Fuss Distance Metric Learning using Proxies", arXiv:1703.07464v3, Aug. 1, 2017, 9 pages.

* cited by examiner

DISTANCE METRIC LEARNING USING PROXIES

FIELD

The present disclosure relates generally to machine learning. More particularly, the present disclosure relates to distance metric learning using proxies.

BACKGROUND

Distance metric learning (DML) is a major tool for a variety of problems in computer vision and other computing problems. As examples, DML has successfully been employed for image retrieval, near duplicate detection, clustering, and zero-shot learning.

A wide variety of formulations have been proposed. Traditionally, these formulations encode a notion of similar and dissimilar data points. One example is contrastive loss, which is defined for a pair of either similar or dissimilar data points. Another commonly used family of losses is triplet loss, which is defined by a triplet of data points: an anchor point, a similar data point, and one or more dissimilar data points. In some schemes, the goal in a triplet loss is to learn a distance in which the anchor point is closer to the similar point than to the dissimilar one.

The above losses, which depend on pairs or triplets of data points, empirically suffer from sampling issues: selecting informative pairs or triplets is important for successfully optimizing them and improving convergence rates but represents a difficult challenge.

SUMMARY

Aspects and advantages of embodiments of the present disclosure will be set forth in part in the following description, or can be learned from the description, or can be learned through practice of the embodiments.

One aspect of the present disclosure is directed to a computer system to perform distance metric learning using proxies. The computer system includes a machine-learned distance model configured to receive input data points and, in response, provide respective embeddings for the input data points within an embedding space. A distance between a pair of embeddings provided for a pair of the input data points is indicative of a similarity between the pair of the input data points. The computer system includes one or more processors and one or more non-transitory computer readable media that collectively store instructions that, when executed by the one or more processors cause the computer system to perform operations. The operations include accessing a training dataset that includes a plurality of data points to obtain an anchor data point. The operations include inputting the anchor data point into the machine-learned distance model. The operations include receiving a first embedding provided for the anchor data point by the machine-learned distance model. The operations include evaluating a loss function that compares the first embedding to a positive proxy and one or more negative proxies. Each of the positive proxy and the one or more negative proxies serve as a proxy for two or more data points included in the training dataset. The operations include adjusting one or more parameters of the machine-learned distance model based at least in part on the loss function.

Another aspect of the present disclosure is directed to a computer-implemented method to perform distance metric learning using proxies. The method includes accessing, by one or more computing devices, a training dataset that includes a plurality of data points to obtain an anchor data point. The method includes inputting, by the one or more computing devices, the anchor data point into a machine-learned distance model. The method includes receiving, by the one or more computing devices, a first embedding provided for the anchor data point by the machine-learned distance model. The method includes evaluating, by the one or more computing devices, a loss function that compares the first embedding to one or more of: a positive proxy and one or more negative proxies. One or more of the positive proxy and the one or more negative proxies serve as a proxy for two or more data points included in the training dataset. The method includes adjusting, by the one or more computing devices, one or more parameters of the machine-learned distance model based at least in part on the loss function.

Another aspect of the present disclosure is directed to one or more non-transitory computer-readable media that collectively store instructions that, when executed by one or more processors, cause the one or more processors to perform operations. The operations include accessing a training dataset that includes a plurality of data points to obtain an anchor data point. The operations include inputting the anchor data point into a machine-learned distance model. The operations include receiving a first embedding provided for the anchor data point by the machine-learned distance model. The operations include evaluating a loss function that compares the first embedding to one or more of: a positive proxy and one or more negative proxies. One or more of the positive proxy and the one or more negative proxies serve as a proxy for two or more data points included in the training dataset. The operations include adjusting one or more parameters of the machine-learned distance model based at least in part on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

1. Introduction

Figure 1:
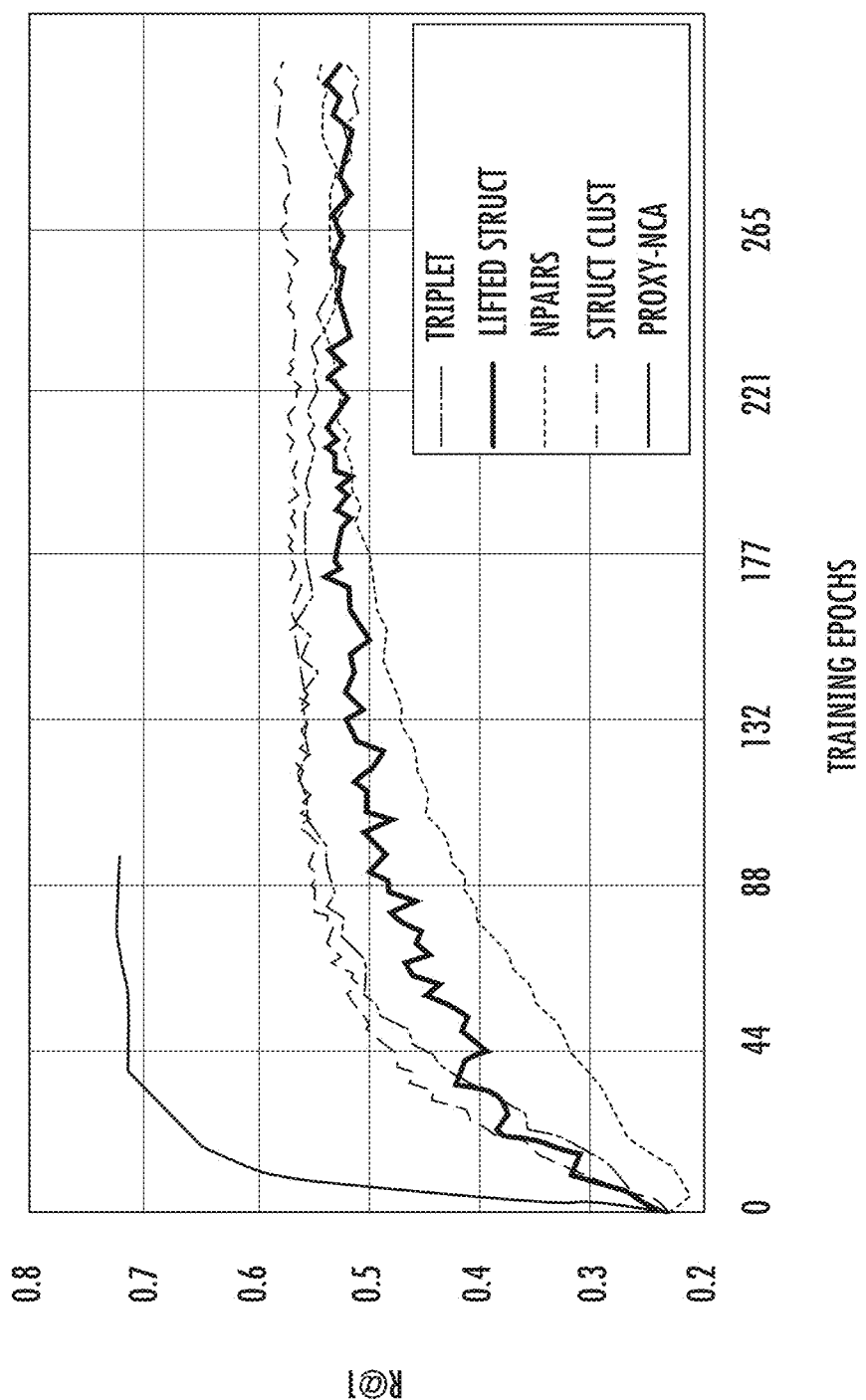
FIG. 1 depicts a graph of example Recall@1 results as a function of training step on the Cars196 dataset according to example embodiments of the present disclosure.

Generally, the present disclosure is directed to systems and methods that enable distance metric learning using proxies. In particular, a machine-learned distance model can be trained in a proxy space using a loss function that compares an embedding provided for an anchor data point of a training dataset to a positive proxy and/or one or more negative proxies. The positive proxy and/or the one or more negative proxies can serve as a proxy for two or more data points included in the training dataset. Thus, each proxy can approximate a number of data points in the training dataset, enabling faster convergence.

As one example, the loss function can compare a first distance between the embedding provided for the anchor data point and the positive proxy to one or more second distances between the embedding and the one or more negative proxies. For example, the loss function can include a constraint that the first distance be less than each of the one or more second distances. Thus, in some implementations, the proxy-based loss functions provided by the present disclosure can in some ways be similar to certain existing triplet loss formulations, but can replace the use of actual positive and negative data points explicitly sampled from the dataset with positive and negative proxies that serve as a proxy for multiple of such data points.

According to another aspect, the proxies of the proxy space can themselves be learned parameters, such that the proxies and the model are trained jointly. For example, the proxies can be contained in a proxy matrix that is viewed as part of the model structure itself or is otherwise jointly trained with the model.

As such, in some implementations, the systems and methods of the present disclosure are not required to select or otherwise identify informative triplets from the dataset at all, but instead can simply compare a given anchor data point to one or more learned proxies. Thus, the present disclosure provides the technical effect and benefit faster convergence (e.g., reduced training time) without sacrificing the ultimate accuracy of the model. In fact, the present disclosure provides example experiments which demonstrate that, in addition to the convergence benefits, models trained using the proxy-based scheme of the present disclosure achieve a new state of the art on several popular training datasets. Thus, the present disclosure also provides the technical effect and benefit of improved and higher performance machine-learned distance models. These models can be used to provide improved services for a number of different applications, including, for example, image retrieval, near duplicate detection, clustering, and zero-shot learning.

More particularly, the systems and methods of the present disclosure address the problem of distance metric learning (DML), which can, in some instances, be defined as learning a distance consistent with a notion of semantic similarity. Traditionally, for this problem supervision is expressed in the form of sets of points that follow an ordinal relationship: an anchor point x is similar to a set of one or more positive points Y, and dissimilar to a set of one or more negative points Z, and a loss defined over these distances is minimized. Example existing formulations for distance metric learning include contrastive loss or triplet loss, which encode a notion of similar and dissimilar datapoints as described above.

Existing formulations which depend on pairs or triplets of data points empirically suffer from sampling issues: selecting informative pairs or triplets is important for successfully optimizing them and improving convergence rates but is a challenging task. Thus, these existing formulations, including triplet-based methods, are challenging to optimize. One primary issue is the need for finding informative pairs or triplets of data points, which is usually achieved by a variety of tricks such as increasing the batch size, hard or semi-hard triplet mining, etc. Even with these tricks, the convergence rate of such methods is slow.

The present disclosure addresses this challenge and proposes to re-define triplet-based losses over a different space of points, which are referred to herein as proxies. This space approximates the training set of data points. For example, for each data point in the original space, there can be a proxy point close to it. Thus, according to one example aspect, the present disclosure proposes to optimize the triplet loss over triplets within a proxy space, where each triplet within the proxy space includes an anchor data point and similar and dissimilar proxy points, which can be learned as well. These proxies can approximate the original data points, so that a triplet loss over the proxies is a tight upper bound of the original loss.

Additionally, in some implementations, the proxy space is small enough so that triplets from the original dataset are not required to be selected or sampled at all, but instead the loss can be explicitly written over all (or most) of the triplets involving proxies. As a result, this re-defined loss is easier to optimize, and it trains faster.

In addition, in some implementations, the proxies are learned as part of the model parameters. In particular, in some implementations, the proxy-based approach provided by the present disclosure can compare full sets of examples. Both the embeddings and the proxies can be trained end-to-end (indeed, in some implementations, the proxies are part of the network architecture), without, in at least some implementations, requiring interruption of training to re-compute the cluster centers, or class indices.

The proxy-based loss proposed by the present disclosure is also empirically better behaved. In particular, the present disclosure shows that the proxy-based loss is an upper bound to triplet loss and that, empirically, the bound tightness improves as training converges, which justifies the use of proxy-based loss to optimize the original loss.

Further, the present disclosure demonstrates that the resulting distance metric learning problem has several desirable properties. As a first example, the obtained metric performs well in the zero-shot scenario, improving state of the art, as demonstrated on three widely used datasets for this problem (CUB200, Cars196 and Stanford Products). As a second example, the learning problem formulated over proxies exhibits empirically faster convergence than other metric learning approaches. More particularly, example experiments described herein demonstrate that the proxy-loss scheme of the present disclosure improves on state-of-art results for three standard zero-shot learning datasets, by up to 15% points, while converging three times as fast as other triplet-based losses.

To provide one example of the dual convergence and accuracy benefits of the proxy-loss scheme of the present disclosure, FIG. 1 depicts an example results graph of Recall@1 as a function of training step on the Cars196 dataset. As illustrated in FIG. 1, an example proxy-based scheme of the present disclosure referred to as Proxy-NCA converges about three times as fast compared with certain existing baseline methods, while also resulting in higher Recall@1 values.

2. Example Metric Learning Using Proxies

2.1 Example Problem Formulation

Aspects of the present disclosure address the problem of learning a distance $d(x, y; \theta)$ between two data points $x$ and $y$. For example, it can be defined as Euclidean distance between embeddings of data obtained via a deep neural network $e(x; \theta)$: $d(x, y; \theta) = \|e(x; \theta) - e(y; \theta)\|_2^2$, where $\theta$ are the parameters of the network. To simplify the notation, in the following discussion the full $\theta$ notation is dropped, and instead $x$ and $e(x; \theta)$ are used interchangeably.

Often times such distances are learned using similarity style supervision, e.g., triplets of similar and dissimilar points (or groups of points) $D=\{(x, y, z)\}$, where in each triplet there is an anchor point $x$, and the second point $y$ (the positive) is more similar to $x$ than the third point $z$ (the negative). Note that both $y$ and, more commonly, $z$ can be sets of positive/negative points. The notation Y, and Z is used whenever sets of points are used.

In some instances, the DML task is to learn a distance respecting the similarity relationships encoded in D:

$$d(x,y;\theta) \leq d(x,z;\theta) f \text{ or all}(x,y,z) \in D \quad (1)$$

One example ideal loss, precisely encoding Eq. (1), reads:

$$L_{Ranking}(x,y,z) = H(d(x,y) - d(x,z)) \quad (2)$$

where H is the Heaviside step function. Unfortunately, this loss is not amenable directly to optimization using stochastic gradient descent as its gradient is zero everywhere. As a result, one might resort to surrogate losses such as Neighborhood Component Analysis (NCA) (See, S. Roweis et al. Neighbourhood component analysis. Adv. Neural Inf. Process. Syst. (NIPS), 2004) or margin-based triplet loss (See, K. Q. Weinberger et al. Distance metric learning for large margin nearest neighbor classification. Advances in neural information processing systems, 18:1473, 2006; and F. Schroff et al. Facenet: A unified embedding for face recognition and clustering. In The IEEE Conference on Computer Vision and Pattern Recognition (CVPR), June 2015). For example, triplet loss can use a hinge function to create a fixed margin between the anchor-positive difference, and the anchor-negative difference:

$$L_{triplet}(x,y,z) = [d(x,y) + M - d(x,z)]_+ \quad (3)$$

where M is the margin, and $[._+]$ is the hinge function.

Similarly, the NCA loss tries to make x closer to y than to any element in a set Z using exponential weighting:

$$L_{NCA}(x, y, Z) = -\log\left(\frac{\exp(-d(x, y))}{\sum_{z \in Z} \exp(-d(x, z))}\right) \quad (4)$$

2.2 Example Sampling and Convergence

Neural networks can be trained using a form of stochastic gradient descent, where at each optimization step a stochastic loss is formulated by sampling a subset of the training set D, called a batch. The size of a batch b is typically small. For example, in many modern computer vision network architectures b=32. While for classification or regression the loss typically depends on a single data point from D, the above distance learning losses depend on at least three data points. As such, the total number of possible samples could be in $O(n^3)$ for $|D|=n$.

To see this, consider that a common source of triplet supervision is from a classification-style labeled dataset: a triplet (x, y, z) is selected such that x and y have the same label while x and z do not. For illustration, consider a case where points are distributed evenly between k classes. The number of all possible triplets is then $kn/k \cdot ((n/k)-1)(k-1) \cdot n/k = n^2(n-k)(k-1)/k^2 = O(n^3)$.

As a result, in metric learning each batch typically samples a very small subset of all possible triplets, i.e., in the order of $O(b^3)$. Thus, in order to see all triplets in the training one would have to go over $O((n/b)^3)$ steps, while in the case of classification or regression the needed number of steps is $O(n/b)$. Note that n is typically in the order of hundreds of thousands, while b is between a few tens to about a hundred, which leads to n/b being in the tens of thousands.

Empirically, the convergence rate of the optimization procedure is highly dependent on being able to see useful triplets, e.g., triplets which give a large loss value as motivated by F. Schroff et al. Facenet: A unified embedding for face recognition and clustering. In The IEEE Conference on Computer Vision and Pattern Recognition (CVPR), June 2015. These authors propose to sample triplets within the data points present in the current batch. However, the problem of sampling from the whole set of triplets D remains particularly challenging as the number of triplets is so overwhelmingly large.

2.3 Example Proxy Ranking Loss

To address the above sampling problem, the present disclosure proposes to learn a small set of data points P with $|P| \ll |D|$. Typically, it is desirable for P to approximate the set of all data points. That is, for each x there is one element in P which is close to x w.r.t. the distance metric d. Such an element is referred to herein as a proxy for x:

$$p(x) = \underset{p \in P}{\arg\min}\, d(x, p) \quad (5)$$

The proxy approximation error is denoted by the worst approximation among all data points $$\varepsilon = \max_x d(x, p(x)) \quad (6)$$

The present disclosure proposes to use these proxies to express the ranking loss. Further, because the proxy set is smaller than the original training data, the number of triplets is significantly reduced.

Figure 2A:
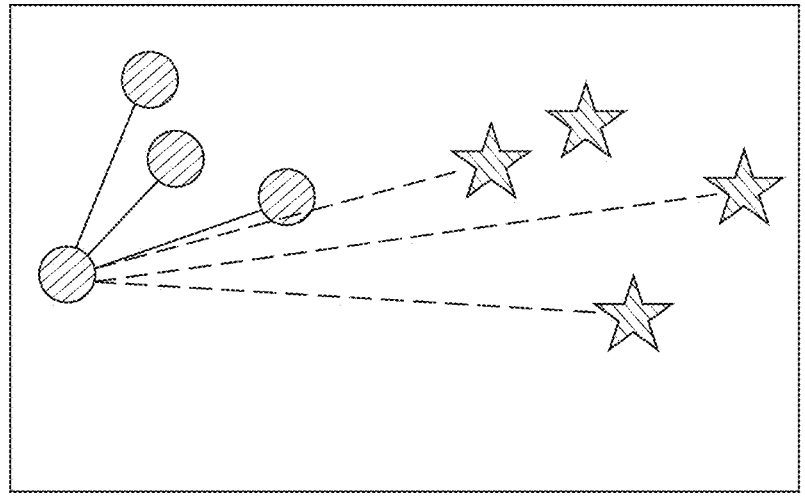
FIG. 2A depicts a graphical diagram of example triplets according to example embodiments of the present disclosure.
Figure 2B:
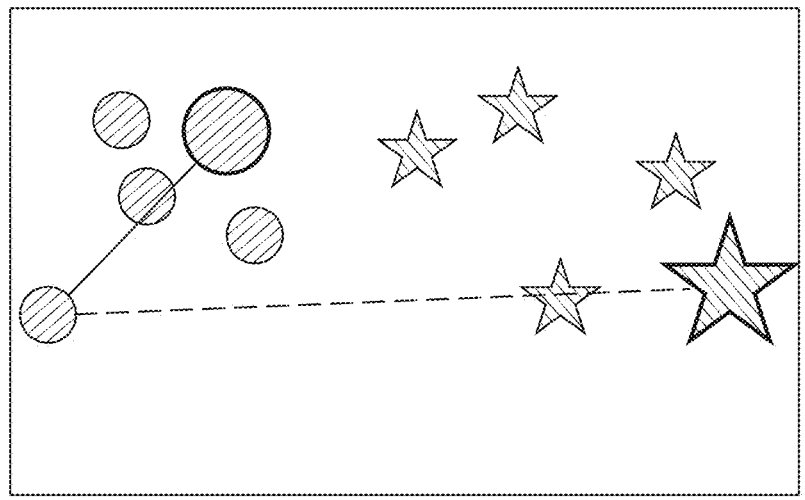
FIG. 2B depicts a graphical diagram of example triplets formed using proxies according to example embodiments of the present disclosure.

To provide an illustrated example, FIGS. 2A-B depict simplified graphical diagrams of example triplets. In FIG. 2A, instances (i.e., data points) are represented by the small circles and stars. In particular, instances associated with a first semantic concept are represented by circles while instances associated with a second semantic concept are represented by stars. There are 48 triplets that can be formed from the instances illustrated in FIG. 2A.

Figure 8:
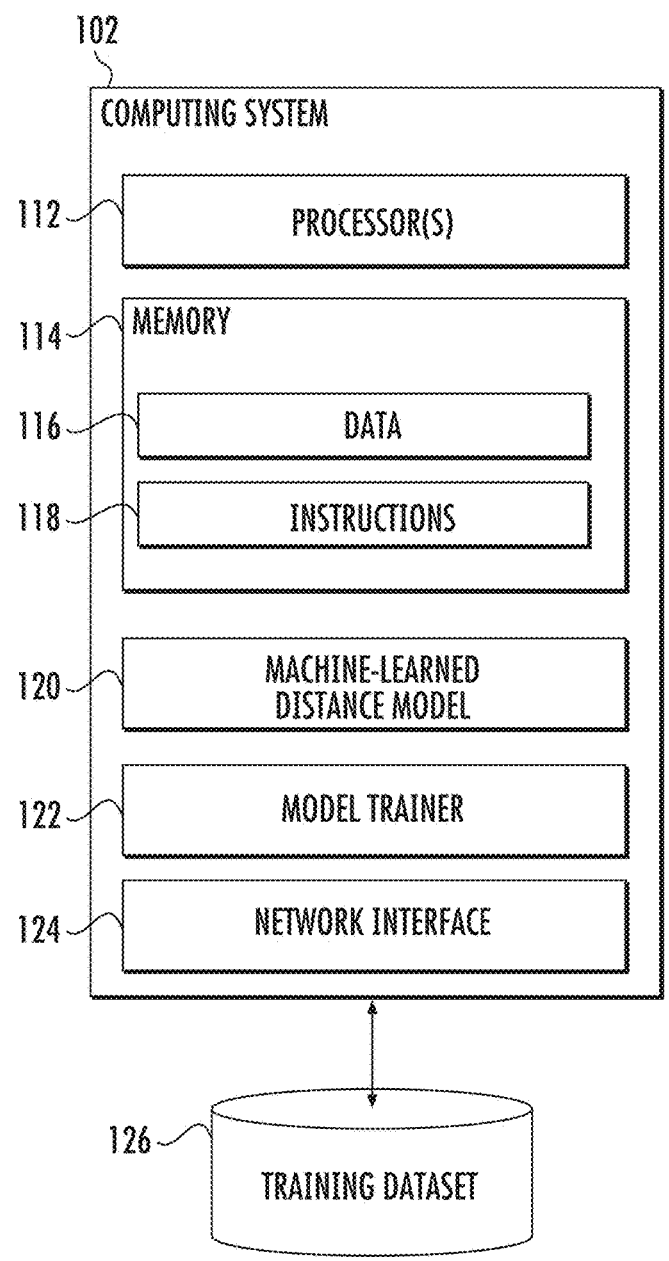
FIG. 8 depicts a block diagram of an example computing system to perform distance metric learning using proxies according to example embodiments of the present disclosure.

In FIG. 2B, proxies (which are represented by the larger circle and larger star) serve as a concise representation for each semantic concept, one that fits in memory. In contrast to the 48 potential triplets illustrated in FIG. 2A, by forming triplets using proxies as illustrated in FIG. 2B, 8 comparisons are sufficient.

Additionally, since the proxies represent the original data, the reformulation of the loss would implicitly encourage the desired distance relationship in the original training data.

To see this, consider a triplet (x, y, z) for which Eq. (1) is to be enforced. By triangle inequality, $$|\{d(x,y) - d(x,z)\} - \{d(x,p(y)) - d(x,p(z))\}| \leq 2\varepsilon$$

As long as $|d(x, p(y)) - d(x, p(z))| > 2\varepsilon$, the ordinal relationship between the distance $d(x, y)$ and $d(x, z)$ is not changed when y, z are replaced by the proxies p(y), p(z). Thus, the expectation of the ranking loss over the training data can be bounded:

$$E[L_{Ranking}(x;y,z)] \leq E[L_{Ranking}(x;p(y),p(z))] + Pr[|d(x,p(y)) - d(x,p(z))| \leq 2\varepsilon]$$

Under the assumption that all the proxies have norm $\|p\| = N_p$ and all embeddings have the same norm $\|x\| = N_x$, the bound can be tightened. Note that in this case, for any $\alpha > 0$:

$$L_{Ranking}(x, y, z) =$$
$$H(\|\alpha x - p(y)\| - \|\alpha x - p(z)\|) = H(\|\alpha x - p(y)\|^2 - \|\alpha x - p(z)\|^2) =$$
$$H(2\alpha(x^T p(z) - x^T p(y))) = H(x^T p(z) - x^T p(y)).$$

That is, the ranking loss is scale invariant in x. However, such re-scaling affects the distances between the embeddings and proxies. The value of $\alpha$ can be chosen judiciously to obtain a better bound. As one example, a good value would be one that makes the embeddings and proxies lie on the same sphere, i.e. $\alpha = N_p/N_x$. These assumptions prove easy to satisfy, see Section 3.

The ranking loss is difficult to optimize, particularly with gradient based methods. Many losses, such as NCA loss (S. Roweis et al. Neighbourhood component analysis. Adv. Neural Inf. Process. Syst. (NIPS), 2004), Hinge triplet loss (K. Q. Weinberger et al. Distance metric learning for large margin nearest neighbor classification. Advances in neural information processing systems, 18:1473, 2006), N-pairs loss (K. Sohn. Improved deep metric learning with multi-class n-pair loss objective. In D. D. Lee et al., editors, Advances in Neural Information Processing Systems 29, pages 1857-1865. Curran Associates, Inc., 2016), etc. are merely surrogates for the ranking loss.

In the next section, it is shown how the proxy approximation can be used to bound the popular NCA loss for distance metric learning. Although extensive discussion is provided relative to the NCA loss for distance metric learning, the proxy techniques described herein are broadly applicable to other loss formulations as well, including, for example, various other types of triplet-based methods (e.g., Hinge triplet loss) or other forms of similarity style supervision. Application of the proxy-based technique to these other loss formulations is within the scope of the present disclosure.

3. Example Training

This section provides an example explanation of how to use the introduced proxies to train a distance based on the NCA formulation. It is desirable to minimize the total loss, defined as a sum over triplets (x, y, Z) (see Eq. (1)). Instead, however, the upper bound is minimized, defined as a sum over triplets over an anchor and two proxies (x, p(y), p(Z)) (see Eq. (7)).

This optimization can be performed by gradient descent, one example of which is outlined below in Algorithm 1.

---
Algorithm 1 Example Proxy-NCA Training.

1:     Randomly initialize all values in θ including proxy vectors.
2:     for i = 1 . . . T do
3:         Sample triplet (x, y, Z) from D
4:         Formulate proxy triplet (x, p(y), p(Z))
5:     $l = -\log\left(\dfrac{\exp(-d(x, p(y)))}{\sum_{p(z) \in p(Z)} \exp(-d(x, p(z)))}\right)$
6:     $\theta \leftarrow \theta - \lambda \partial_\theta l$
7:     end for

---

At each step, a triplet of a data point and at least two proxies (x, p(y), p(z)) is sampled, which can be defined by a triplet (x, y, z) in the original training data. However, each triplet defined over proxies upper bounds all triplets (x, y', z') whose positive y' and negative z' data points have the same proxies as y and z respectively. This provides convergence speed-up. The proxies can all be held in memory, and sampling from them is simple. In practice, when an anchor point is encountered in the batch, one can use its positive proxy as y, and all negative proxies as Z to formulate triplets that cover all points in the data. Back propagation can be performed through both points and proxies, and training does not need to be paused to re-calculate the proxies at any time.

In some implementations, the model can be trained with the property that all proxies have the same norm $N_P$ and all embeddings have the norm $N_X$. Empirically such a model performs at least as well as without this constraint, and it makes applicable the tighter bounds discussed in Section 2.3. While the equal norm property can be incorporated the model during training, for the example experiments described herein, the model was simply trained with the desired loss, and all proxies and embeddings were re-scaled to the unit sphere (note that the transformed proxies are typically only used for analyzing the effectiveness of the bounds, but are not used during inference).

3.1 Proxy Assignment and Triplet Selection

In the above algorithm, the proxies need to be assigned for the positive and negative data points. Two example assignment procedures are described below.

When triplets are defined by the semantic labels of data points (e.g., the positive data point has the same semantic label as the anchor; the negative a different label), then a proxy can be associated with each semantic label: $P=\{p_1 \ldots p_L\}$. Let $c(x)$ be the label of x. A data point can be assigned the proxy corresponding to its label: $p(x)=p_{c(x)}$. This scheme can be referred to as static proxy assignment as it is defined by the semantic label and does not change during the execution of the algorithm. Importantly, in this case, there is no need to sample triplets at all. Instead, one just needs to sample an anchor point x, and use the anchor's proxy as the positive, and the rest as negatives: $L_{NCA}(x, p(x), p(Z); \theta)$.

In the more general case, however, semantic labels may not be available. Thus, a point x can be assigned to the closest proxy, as defined in Eq. (5). This scheme can be referred to as dynamic proxy assignment. See Section 5 for evaluation with the two proxy assignment methods.

3.2 Proxy-Based Loss Bound

In addition to the motivation for proxies in Sec. 3.3, it is also shown below that the proxy based surrogate losses upper bound versions of the same losses defined over the original training data. In this way, the optimization of a single triplet of a data point and two proxies bounds a large number of triplets of the original loss.

More precisely, if a surrogate loss L over triplet (x, y, z) can be bounded by proxy triplet $$L(x,y,z) \leq \alpha L(x,p(y),p(z)) + \delta$$

for constant $\alpha$ and $\delta$, then the following bound holds for the total loss:

$$L(D) \leq \frac{\alpha}{|D|} \sum_{x;p_y,p_z \in P} n_{x,p_y,p_z} L(x, p(y), p(z)) + \delta \quad (7)$$

where $n_{x,p_y,p_z}=|\{(x, y, z) \in D | p(y)=p_y, p(z)=p_z\}|$ denotes the number of triplets in the training data with anchor x and proxies $p_y$ and $p_z$ for the positive and negative data points.

The quality of the above bound depends on $\delta$, which depends on the loss and also on the proxy approximation error $\varepsilon$. It will be shown for concrete loss that the bound gets tighter for small proxy approximation error.

The proxy approximation error depends to a degree on the number of proxies |P|. In the extreme case, the number of proxies is equal to the number of data points, and the approximation error is zero. Naturally, the smaller the number of proxies the higher the approximation error. However, the number of terms in the bound is in $O(n|P|^2)$. If $|P| \cong n$ then the number of samples needed will again be $O(n^3)$. In some instances, it is desirable to keep the number of terms as small as possible, as motivated in the previous section, while keeping the approximation error small as well. Thus, a balance between small approximation error and small number of terms in the loss can be struck. In the experiments described herein, the number of proxies varies from a few hundreds to a few thousands, while the number of data points is in the tens/hundreds of thousands.

Proxy loss bounds: For the following example discussion it is assumed that the norms of proxies and data points are constant $|p_x|=N_p$ and $|x|=N_x$, and it is denoted that $$\alpha = \frac{1}{N_p N_x}.$$

Then the following bounds of the original losses by their proxy versions are:

Proposition 3.1 The NCA loss (see Eq. (4)) is proxy bounded:

$$\hat{L}_{NCA}(x,y,Z) \leq \alpha \hat{L}_{NCA}(x,p_y,p_z) + (1-\alpha)\log(|Z|) + 2\sqrt{2\varepsilon}$$

where $\hat{L}_{NCA}$ is defined as $L_{NCA}$ with normalized data points and |Z| is the number of negative points used in the triplet.

Proposition 3.2 The margin triplet loss (see Eq. (3)) is proxy bounded:

$$\hat{L}_{triplet}(x,y,z) \leq \alpha L_{triplet}(x,p_y,p_z) + (1-\alpha)M + 2\sqrt{\varepsilon}$$

where $\hat{L}_{triplet}$ is defined as $L_{triplet}$ with normalized data points.

See Section 7 for proofs.

4. Example Implementation Details

Example implementations of the above described systems and methods will now be described. TensorFlow Deep Learning framework was used for all example implementations described below. For fair comparison, the implementation details of (Hyun Oh Song et al. Learnable Structured Clustering Framework for Deep Metric Learning. *The IEEE Conference on Computer Vision and Pattern Recognition (CVPR)*, 2017) were followed. The Inception (Christian Szegedy et al. Going Deeper with Convolutions. *arXiv preprint arXiv:* 1409.4842, 2014) architecture was used with batch normalization (Sergey Ioffe and Christian Szegedy. Batch Normalization: Accelerating Deep Network Training by Reducing Internal Covariate Shift. *arXiv preprint arXiv:* 1502.03167, 2015). All methods are first pretrained on ILSVRC 2012-CLS data (Russakovsky, et al. Imagenet large scale visual recognition challenge. *International Journal of Computer Vision*, 115(3):211-252, 2015), and then fine-tuned on the tested datasets. The size of the learned embeddings is set to 64. The inputs are resized to 256×256 pixels, and then randomly cropped to 227×227. The numbers reported in Sohn, Kihyuk. Improved Deep Metric Learning with Multi-class N-pair Loss Objective. In D. D. Lee and M. Sugiyama and U. V. Luxburg and I. Guyon and R. Garnett, editors, *Advances in Neural Information Processing Systems* 29, pages 1857-1865. Curran Associates, Inc., 2016 are using multiple random crops during test time, but for fair comparison with the other methods, and following the procedure in Hyun Oh Song et al. Learnable Structured Clustering Framework for Deep Metric Learning. *The IEEE Conference on Computer Vision and Pattern Recognition (CVPR)*, 2017, the example implementations described below use only a center crop during test time. The RMSprop optimizer was used with the margin multiplier constant γ decayed at a rate of 0.94. The only difference that was taken from the setup described in Hyun Oh Song et al. Learnable Structured Clustering Framework for Deep Metric Learning. *The IEEE Conference on Computer Vision and Pattern Recognition (CVPR)*, 2017 is that for the method proposed herein, a batch size m of 32 images was used (all other methods use m=128). This was done to illustrate one of the benefits of the proposed method—it does not require large batches. The results have been experimentally confirmed as stable when larger batch sizes are used for our method.

Most of the experiments are done with a Proxy-NCA loss. However, proxies can be used in many popular metric learning algorithms, as outlined in Section 2. To illustrate this point, results of using a Proxy-Triplet approach on one of the datasets are also reported, see Section 5 below.

5. Example Evaluation

Based on the experimental protocol detailed in Hyun Oh Song et al. Learnable Structured Clustering Framework for Deep Metric Learning. *The IEEE Conference on Computer Vision and Pattern Recognition (CVPR)*, 2017 and Sohn, Kihyuk. Improved Deep Metric Learning with Multi-class N-pair Loss Objective. In D. D. Lee and M. Sugiyama and U. V. Luxburg and I. Guyon and R. Garnett, editors, *Advances in Neural Information Processing Systems* 29, pages 1857-1865. Curran Associates, Inc., 2016, retrieval at k and clustering quality on data from unseen classes was evaluated on 3 datasets: CUB200-2011 (Wah et al. The caltech-ucsd birds-200-2011 dataset. 2011), Cars196 (Krause et al. 3d object representations for fine-grained categorization. *Proceedings of the IEEE International Conference on Computer Vision Workshops*, pages 554-561, 2013), and Stanford Online Products (Oh Song, Hyun et al. Deep metric learning via lifted structured feature embedding. *Proceedings of the IEEE Conference on Computer Vision and Pattern Recognition*, 2016). Clustering quality is evaluated using the Normalized Mutual Information measure (NMI). NMI is defined as the ratio of the mutual information of the clustering and ground truth, and their harmonic mean. Let $\Omega = \{\omega_1, \omega_2, \ldots, \omega_k\}$ be the cluster assignments that are, for example, the result of K-Means clustering. That is, $\omega_i$ contains the instances assigned to the i'th cluster. Let $\mathbb{C} = \{c_1, c_2, \ldots, c_m\}$ be the ground truth classes, where $c_j$ contains the instances from class j.

$$NMI(\Omega, \mathbb{C}) = 2\frac{I(\Omega, \mathbb{C})}{H(\Omega) + H(\mathbb{C})}. \quad (8)$$

Note that NMI is invariant to label permutation which can be a desirable property for the evaluation. For more information on clustering quality measurement see Manning et al. Introduction to information retrieval. Cambridge university press Cambridge, 2008.

The Proxy-based method described herein is compared with 4 state-of-the-art deep metric learning approaches: Triplet Learning with semi-hard negative mining (Schroff et al. FaceNet: A Unified Embedding for Face Recognition and Clustering. *The IEEE Conference on Computer Vision and Pattern Recognition (CVPR)*, 2015), Lifted Structured Embedding (Oh Song, Hyun et al. Deep metric learning via lifted structured feature embedding. *Proceedings of the IEEE Conference on Computer Vision and Pattern Recognition*, 2016), the N-Pairs deep metric loss (Sohn, Kihyuk. Improved Deep Metric Learning with Multi-class N-pair Loss Objective. In D. D. Lee and M. Sugiyama and U. V. Luxburg and I. Guyon and R. Garnett, editors, *Advances in Neural Information Processing Systems* 29, pages 1857-1865. Curran Associates, Inc., 2016), and Learnable Structured Clustering (Hyun Oh Song et al. Learnable Structured Clustering Framework for Deep Metric Learning. *The IEEE Conference on Computer Vision and Pattern Recognition (CVPR)*, 2017). In all the experiments the same data splits were used as in Hyun Oh Song et al. Learnable Structured Clustering Framework for Deep Metric Learning. *The IEEE Conference on Computer Vision and Pattern Recognition (CVPR)*, 2017.

5.1 Cars196

Figure 3:
FIG. 3 depicts example retrieval results on a set of images from the Cars196 using a distance model trained by an example proxy-based training technique according to example embodiments of the present disclosure.
Figure 3:
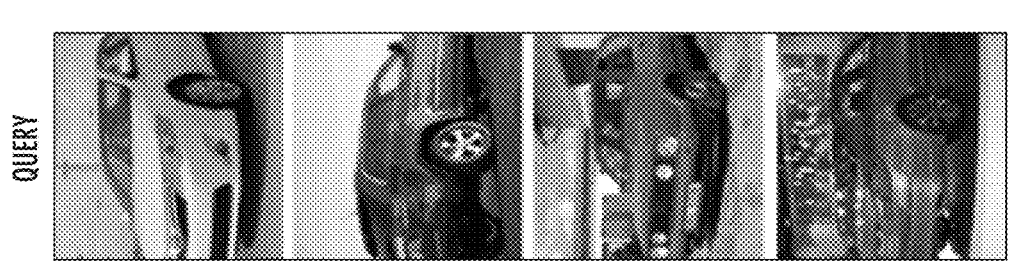

The Cars196 dataset (Krause et al. 3d object representations for fine-grained categorization. *Proceedings of the IEEE International Conference on Computer Vision Workshops*, pages 554-561, 2013) is a fine-grained car category dataset containing 16,185 images of 196 car models. Classes are at the level of make-model-year, for example, Mazda-3-2011. In the experiments the dataset was split such that 50% of the classes are used for training, and 50% are used for evaluation. Table 1 shows recall-at-k and NMI scores for all methods on the Cars196 dataset. Proxy-NCA has a 15 percentage points (26% relative) improvement in recall@1 from previous state-of-the-art, and a 6% point gain in NMI. FIG. 3 shows example retrieval results on the test set of the Cars196 dataset.

FIG. 3: Retrieval results on a set of images from the Cars196 dataset using our proposed proxy-based training method. Left column contains query images. The results are ranked by distance.

TABLE 1

Retrieval and Clustering Performance on the Cars196 dataset. Bold indicates best results.

|  | R@1 | R@2 | R@4 | R@8 | NMI |
| --- | --- | --- | --- | --- | --- |
| Triplet Semihard | 51.54 | 63.78 | 73.52 | 81.41 | 53.35 |
| Lifted Struct | 52.98 | 66.70 | 76.01 | 84.27 | 56.88 |
| Npairs | 53.90 | 66.76 | 77.75 | 86.35 | 57.79 |
| Proxy-Triplet | 55.90 | 67.99 | 74.04 | 77.95 | 54.44 |
| Struct Clust | 58.11 | 70.64 | 80.27 | 87.81 | 59.04 |
| Proxy-NCA | 73.22 | 82.42 | 86.36 | 88.68 | 64.90 |

5.2 Stanford Online Products Dataset

Figure 4:
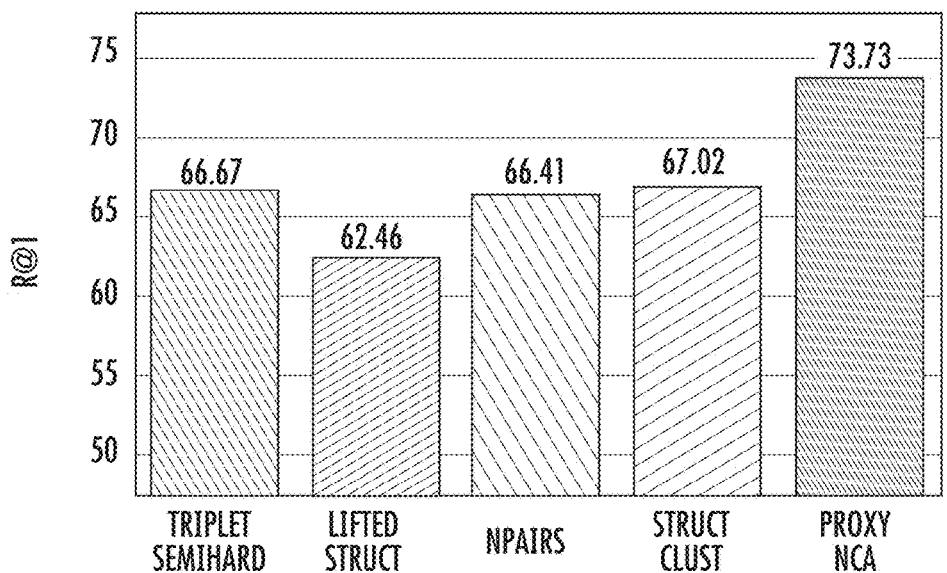
FIG. 4 depicts a graph of Recall@1 results on the Stanford Product dataset according to example embodiments of the present disclosure.

The Stanford product dataset contains 120,053 images of 22,634 products downloaded from eBay.com. For training, 59,5511 out of 11,318 classes are used, and 11,316 classes (60,502 images) are held out for testing. This dataset is more challenging as each product has only about 5 images, and at first seems well suited for tuple-sampling approaches, and less so for the proxy formulation. Note that holding in memory 11,318 float proxies of dimension 64 takes less than 3 Mb. FIG. 4 shows recall-at-1 results on this dataset. Proxy-NCA has over a 6% gap from previous state of the art. Proxy-NCA compares favorably on clustering as well, with a score of 90.6. This, compared with the top method, described in Hyun Oh Song et al. Learnable Structured Clustering Framework for Deep Metric Learning. *The IEEE Conference on Computer Vision and Pattern Recognition (CVPR)*, 2017 which has an NMI score of 89.48. The difference is statistically significant.

FIG. 4: Recall@1 results on the Stanford Product Dataset. Proxy-NCA has a 6% point gap with previous SOTA.

Figure 5:
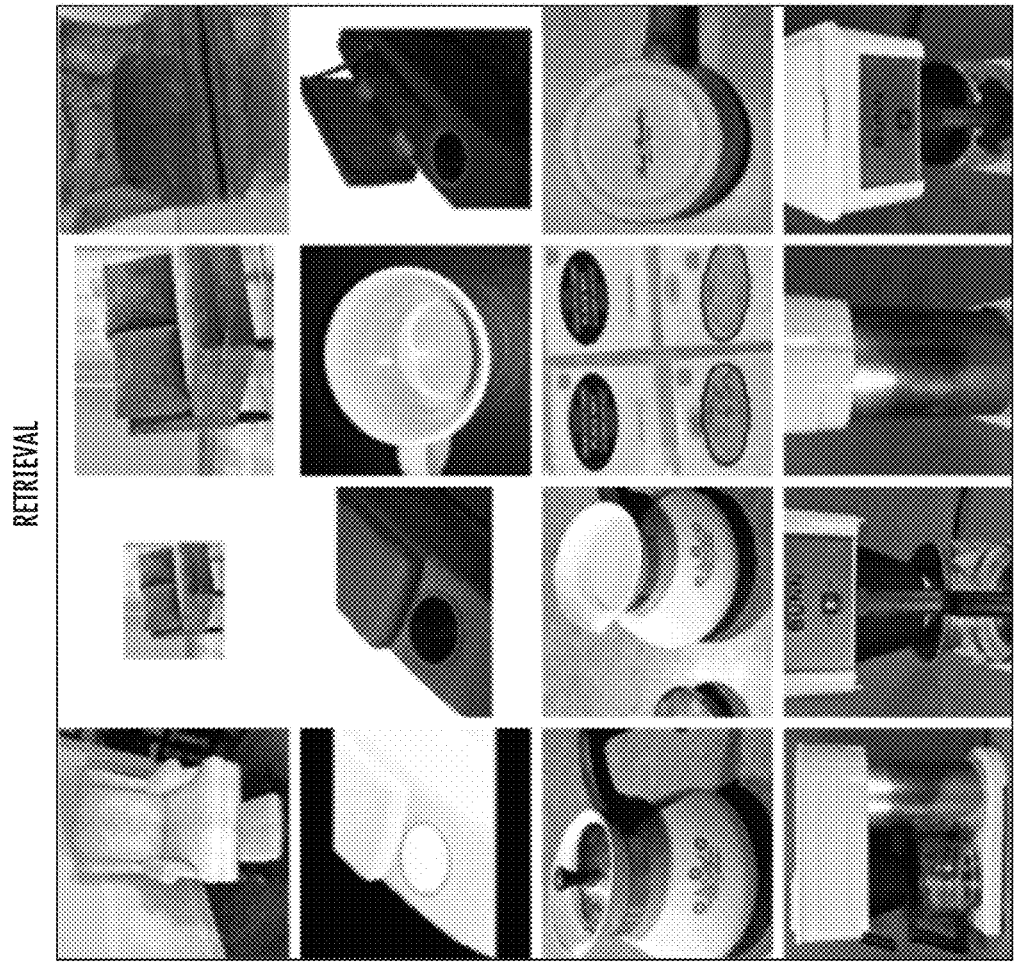
FIG. 5 depicts example retrieval results on a randomly selected set of images from the Stanford Product dataset using a distance model trained by an example proxy-based training technique according to example embodiments of the present disclosure.
Figure 5:
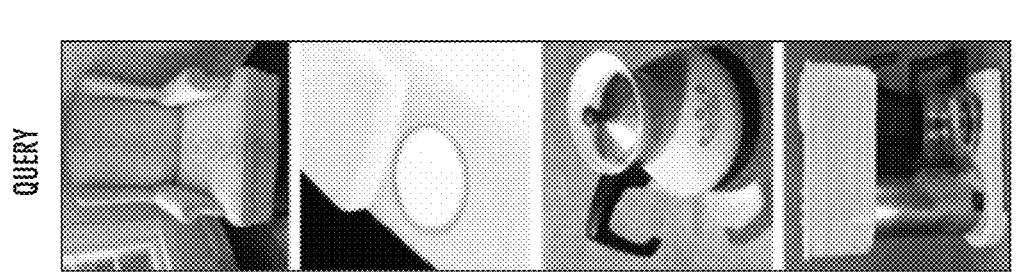

FIG. 5 shows example retrieval results on images from the Stanford Product dataset. Interestingly, the embeddings show a high degree of rotation invariance.

FIG. 5: Retrieval results on a randomly selected set of images from the Stanford Product dataset. Left column contains query images. The results are ranked by distance. Note the rotation invariance exhibited by the embedding.

5.3 CUB200

The Caltech-UCSD Birds-200-2011 dataset contains 11,788 images of birds from 200 classes of fine-grained bird species. The first 100 classes were used as training data for the metric learning methods, and the remaining 100 classes were used for evaluation. Table 2 compares the proxy-NCA with the baseline methods. Birds are notoriously hard to classify, as the inner-class variation is quite large when compared to the intra-class variation. This is apparent when observing the results in the table. All methods perform less well than in the other datasets. Proxy-NCA improves on SOTA for recall at 1-2 and on the clustering metric.

TABLE 2

Retrieval and Clustering Performance on the CUB200 dataset.

|  | R@1 | R@2 | R@4 | R@8 | NMI |
|---|---|---|---|---|---|
| Triplet Semihard | 42.59 | 55.03 | 66.44 | 77.23 | 55.38 |
| Lifted Struct | 43.57 | 56.55 | 68.59 | 79.63 | 56.50 |
| Npairs | 45.37 | 58.41 | 69.51 | 79.49 | 57.24 |
| Struct Clust | 48.18 | 61.44 | 71.83 | 81.92 | 59.23 |
| Proxy NCA | 49.21 | 61.90 | 67.90 | 72.40 | 59.53 |

5.4 Convergence Rate

The tuple sampling problem that affects most metric learning methods makes them slow to train. Keeping all proxies in memory eliminates the need for sampling tuples, and mining for hard negative to form tuples. Furthermore, the proxies act as a memory that persists between batches. This greatly speeds up learning. FIG. 1 compares the training speed of all methods on the Cars196 dataset. Proxy-NCA trains much faster than other metric learning methods, and converges about three times as fast.

5.5 Fractional Proxy Assignment

Figure 6:
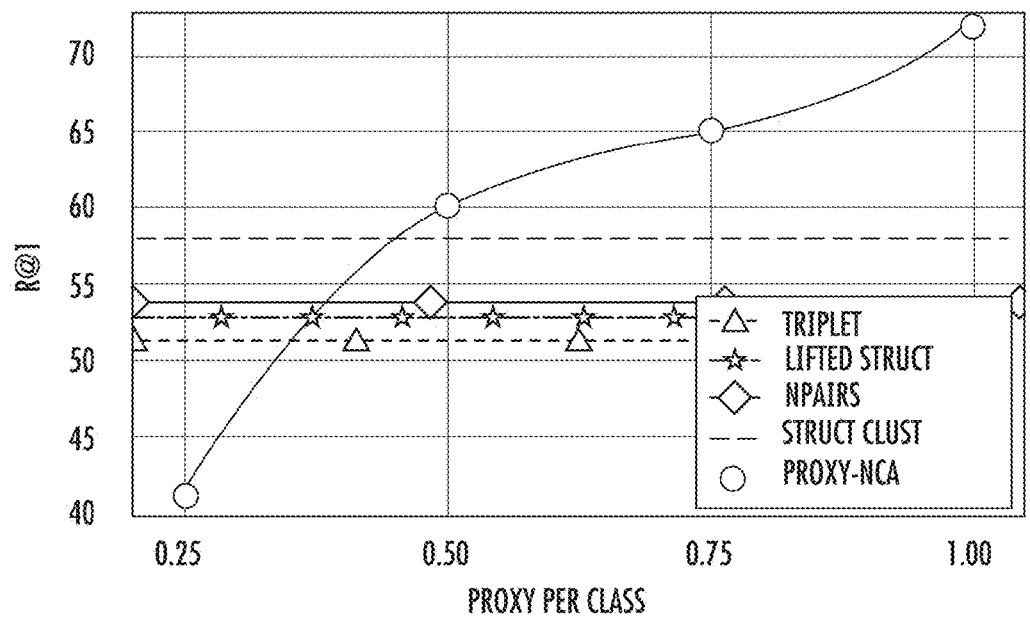
FIG. 6 depicts a graph of example Recall@1 results as a function of ratio of proxies to semantic labels according to example embodiments of the present disclosure.

Metric learning requires learning from a large set of semantic labels at times. Section 5.2 shows an example of such a large label set. Even though Proxy-NCA works well in that instance, and the memory footprint of the proxies is small, here the case where one's computational budget does not allow a one-to-one assignment of proxies to semantic labels is examined. FIG. 6 shows the results of an experiment in which the ratio of labels to proxies was varied on the Cars196 dataset. The static proxy assignment method was varied to randomly pre-assign semantic labels to proxies. If the number of proxies is smaller than the number of labels, multiple labels are assigned to the same proxy. So in effect each semantic label has influence on a fraction of a proxy. Note that when proxy-per-class 0.5 Proxy-NCA has better performance than previous methods.

FIG. 6: Recall@1 results as a function of ratio of proxies to semantic labels. When allowed 0.5 proxies per label or more, Proxy-NCA compares favorably with previous state of the art.

5.6 Dynamic Proxy Assignment

Figure 7:
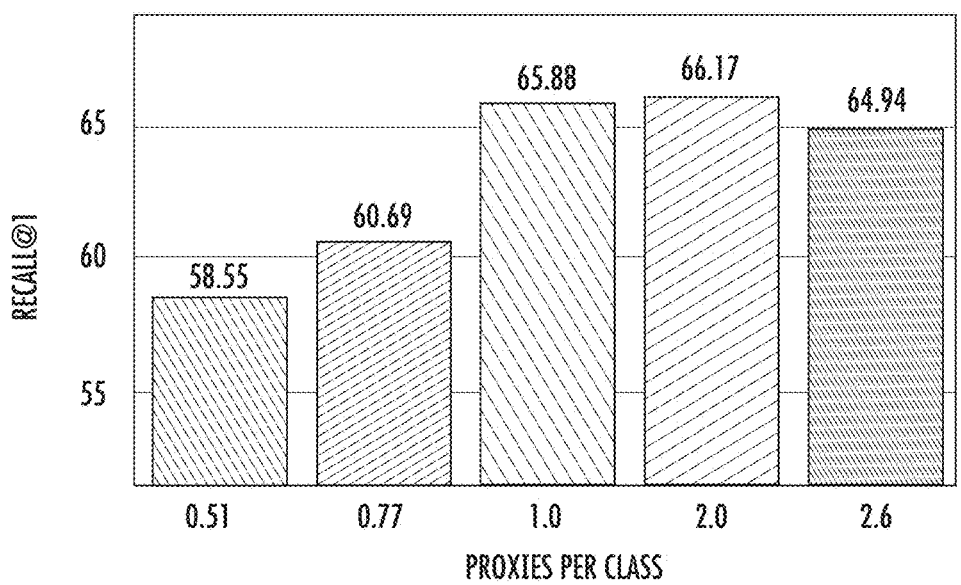
FIG. 7 depicts a graph of example Recall@1 results for dynamic assignment on the Cars196 dataset as a function of proxy-to-semantic-label ratio according to example embodiments of the present disclosure.

In many cases, the assignment of triplets, e.g., selection of a positive, and negative example to use with the anchor instance, is based on the use of a semantic concept—two images of a dog need to be more similar than an image of a dog and an image of a cat. These cases are easily handled by the static proxy assignment, which was covered in the experiments above. In some cases however, there are no semantic concepts to be used, and a dynamic proxy assignment is needed. In this section results using this assignment scheme are provided. FIG. 7 shows recall scores for the Cars196 dataset using the dynamic assignment. The optimization becomes harder to solve, specifically due to the non-differentiable argmin term in Eq. (5). However, it is interesting to note that first, a budget of 0.5 proxies per semantic concept is again enough to improve on state of the art, and one does see some benefit of expanding the proxy budget beyond the number of semantic concepts.

FIG. 7: Recall@1 results for dynamic assignment on the Cars196 dataset as a function of proxy-to-semantic-label ratio. More proxies allow for better fitting of the underlying data, but one needs to be careful to avoid over-fitting.

6. Example Discussion

The present disclosure demonstrates the effectiveness of using proxies for the task of deep metric learning. Using proxies, which can be saved in memory and trained using back-propagation, training time can be reduced, and the resulting models can achieve a new state of the art. The present disclosure presents two proxy assignment schemes—a static one, which can be used when semantic label information is available, and a dynamic one which can be used when the only supervision comes in the form of similar and dissimilar triplets. Furthermore, the present disclosure shows that a loss defined using proxies, upper bounds the original, instance-based loss. If the proxies and instances have constant norms, it is shown that a well optimized proxy-based model does not change the ordinal relationship between pairs of instances.

The formulation of Proxy-NCA loss provided herein produces a loss very similar to the standard cross-entropy loss used in classification. However, this formulation is arrived at from a different direction: in most instances, the systems and methods of the present disclosure are not interested in the actual classifier and indeed discard the proxies once the model has been trained. Instead, the proxies are auxiliary variables, enabling more effective optimization of the embedding model parameters. As such, the formulations provided herein not only surpass the state of the art in zero-shot learning, but also offer an explanation to the effectiveness of the standard trick of training a classifier, and using its penultimate layer's output as the embedding.

7. Example Proof of Proposition 3.1

Proof of Proposition 3.1: In the following for a vector x its unit norm vector is denoted by $\hat{x}=x/|x|$.

First, the dot product of a unit normalized data points $\hat{x}$ and $\hat{y}$ can be upper bounded by the dot product of unit normalized point $\hat{x}$ and proxy $\hat{p}_y$ using the Cauchy inequality as follows:

$$\hat{x}^T(\hat{z}-\hat{p}_z) \leq |\hat{x}||\hat{x}||\hat{z}-\hat{p}_z| \leq \sqrt{\varepsilon} \qquad (9)$$

Hence:

$$\hat{x}^T\hat{z} \leq \hat{x}^T\hat{p}_z + \sqrt{\varepsilon} \qquad (10)$$

Similarly, one can obtain an upper bound for the negative dot product:

$$-\hat{x}^T\hat{y} \leq -\hat{x}^T\hat{p}_y + \sqrt{\varepsilon} \qquad (11)$$

Using the above two bounds, the original NCA loss $L_{NCA}(\hat{x}, \hat{y}, Z)$ can be upper bounded:

$$= -\log\left(\frac{\exp(-1/2|\hat{x}-\hat{y}|^2)}{\sum_{z \in Z} \exp(-1/2|\hat{x}-\hat{z}|^2)}\right)$$

$$= -\log\left(\frac{\exp(-1+\hat{x}^T-\hat{y})}{\sum_{z \in Z} \exp(-1+\hat{x}^T\hat{z})}\right)$$

$$= -\log\left(\frac{\exp(\hat{x}^T\hat{y})}{\sum_{z \in Z} \exp(\hat{x}^T\hat{z})}\right)$$

$$= -\hat{x}^T\hat{y} + \log(\sum_{z \in Z} \exp(\hat{x}^T\hat{z})) \quad (12)$$

$$\leq -\hat{x}^T\hat{p}_y + \sqrt{\varepsilon} + \log(\sum_{z \in Z} \exp(\hat{x}^T\hat{p}_z + \sqrt{\varepsilon}))$$

$$= -\hat{x}^T\hat{p}_y + \log(\sum_{z \in Z} \exp(\hat{x}^T\hat{p}_z)) + 2\sqrt{\varepsilon}$$

$$= L_{NCA}(\hat{x}, \hat{p}_y, \hat{p}_z) + 2\sqrt{\varepsilon} \quad (13)$$

Further, the above loss of unit normalized vectors can be upper bounded by a loss of unnormalized vectors. For this, make the assumption, which empirically has been found true, that for all data points $|x|=N_x>1$. In practice these norm are much larger than 1.

Lastly, if denoted by $$\beta = \frac{1}{N_x N_p}$$

and under the assumption that $\beta<1$, the following version of the Hoelder inequality defined for positive real numbers $\alpha_i$ can be applied:

$$\sum_{i=1}^n a_i^\beta \leq n^{1-\beta}\left(\sum_{i=1}^n a_i\right)^\beta$$

to upper bound the sum of exponential terms:

$$\sum_{z \in Z} \exp(\hat{x}^T\hat{p}_z) = \sum_{z \in Z} \exp(\beta x^T p_z)$$

$$= \sum_{z \in Z} \exp(x^T p_z)^\beta \leq |Z|^{1-\beta}\left(\sum_{z \in Z} \exp(x^T p_z)\right)^\beta$$

Hence, the above loss $L_{NCA}$ with unit normalized points is bounded as:

$$L_{NCA}(\hat{x}, \hat{p}_y, \hat{p}_z) \leq -\frac{x^T p_y}{|x||p_y|} + \log\left(|Z|^{1-\beta}\left(\sum_{z \in Z} \exp(x^T p_z)\right)^\beta\right) = \quad (14)$$

$$-\beta x^T p_y + \beta \log\left(\sum_{z \in Z} \exp(x^T p_z)\right) + \log(|Z|^{1-\beta}) =$$

$$\frac{\beta}{2}|x-p_y|^2 + \beta \log\left(\sum_{z \in Z} \exp\left(-\frac{1}{2}|x-p_z|^2\right)\right) + \log(|Z|^{1-\beta}) =$$

$$\beta L_{NCA}(x, p_y, p_z) + (1-\beta)\log(|Z|)$$

for $$\beta = \frac{1}{N_x N_p}.$$

The propositions follows from Eq. (13) and Eq. (14).

Proof Proposition 3.2: Bound the term inside the hinge function in Eq. (3) for normalized data points using the bounds (10) and (11) from previous proof:

$$|\hat{x}-\hat{y}|^2 - |\hat{x}-\hat{z}|^2 + M = -2\hat{x}^T\hat{y} + 2\hat{x}^T\hat{z} + M \leq -2\hat{x}^T\hat{p}_y + 2\hat{x}^T\hat{p}_z + 2\sqrt{\varepsilon} + M$$

Under the assumption that the data points and the proxies have constant norms, the above dot products can be converted to products of unnormalized points:

$$-2\hat{x}^T\hat{p}_y + 2\hat{x}^T\hat{p}_z + 2\sqrt{\varepsilon} + M =$$

$$\alpha(-2x^T p_y + 2x^T p_z) + 2\sqrt{\varepsilon} + M = \alpha(|x-p_y|^2 - |x-p_z|^2) + 2\sqrt{\varepsilon} + M =$$

$$\alpha(|x-p_y|^2 - |x-p_z|^2 + M) + (1-\alpha)M + 2\sqrt{\varepsilon}$$

8. Example Computing Systems

FIG. 8 depicts an example computing system 102 that can implement the present disclosure. The computing system 102 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially and/or in parallel. In some implementations, the computing device(s) can implement various distributed computing techniques.

The computing system includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

The computing system 102 can further include a machine-learned distance model 120. In some implementations, the machine-learned distance model 120 can be or have been trained to provide, for a pair of data points, a distance between such two data points. For example, the distance can be descriptive of a similarity or relatedness between the two data points, where a larger distance indicates less similarity.

As one example, the distance model 120 can receive input data point or instance (e.g., an image) and, in response, provide an embedding within an embedding space. For example, the embedding can be provided at a final layer of the model 120 or a close to final, but not final layer of the model 120 (e.g., a penultimate layer). In some implementations, the embedding provided by the model 120 for one data point or instance can be compared to an embedding provided by the model 120 for another data point or instance to determine a measure of similarity (e.g., a distance) between the two data points or instances. For example, a Euclidian distance between the two embeddings can be indicative of an amount of similarity (e.g., smaller distances indicate more similarity).

In some implementations, the machine-learned distance model 120 can be or include a neural network (e.g., deep neural network). Neural networks can include feed-forward neural networks, recurrent neural networks, convolutional neural networks, and/or other forms of neural networks. In other implementations, the machine-learned distance model 120 can be or include other types of machine-learned models.

In some implementations, the machine-learned distance model 120 can include or have associated therewith a proxy matrix or other data structure that includes a number of proxies (e.g., proxy vectors). As described above, in some implementations, the proxy matrix can be viewed as parameters of the model 120 itself or can otherwise be jointly trained with the model 120.

The computing system 102 can further include a model trainer 122. The model trainer 122 can train the machine-learned model 120 using various training or learning techniques, such as, for example, backwards propagation of errors, stochastic gradient descent, etc. The model trainer 122 can perform a number of generalization techniques (e.g., weight decays, dropouts, etc.) to improve the generalization capability of the models being trained.

In particular, the model trainer 122 can train a machine-learned distance model 120 based on a set of training data 126. In some implementations, the training dataset 126 can include instances that are labelled (e.g., have one or more labels associated therewith). For example, the labels can correspond to classes or semantic concepts. In other implementations, the training dataset 126 can include instances that are unlabeled (e.g., do not have one or more labels associated therewith). In some implementations, each instance in the training dataset 126 can be or include an image.

The model trainer 122 can include computer logic utilized to provide desired functionality. The model trainer 122 can be implemented in hardware, firmware, and/or software controlling a general purpose processor. For example, in some implementations, the model trainer 122 includes program files stored on a storage device, loaded into a memory and executed by one or more processors. In other implementations, the model trainer 122 includes one or more sets of computer-executable instructions that are stored in a tangible computer-readable storage medium such as RAM hard disk or optical or magnetic media.

The computing system 102 can also include a network interface 124 used to communicate with one or more systems or devices, including systems or devices that are remotely located from the computing system 102. The network interface 124 can include any number of components to provide networked communications (e.g., transceivers, antennas, controllers, cards, etc.).

9. Example Methods

Figure 9:
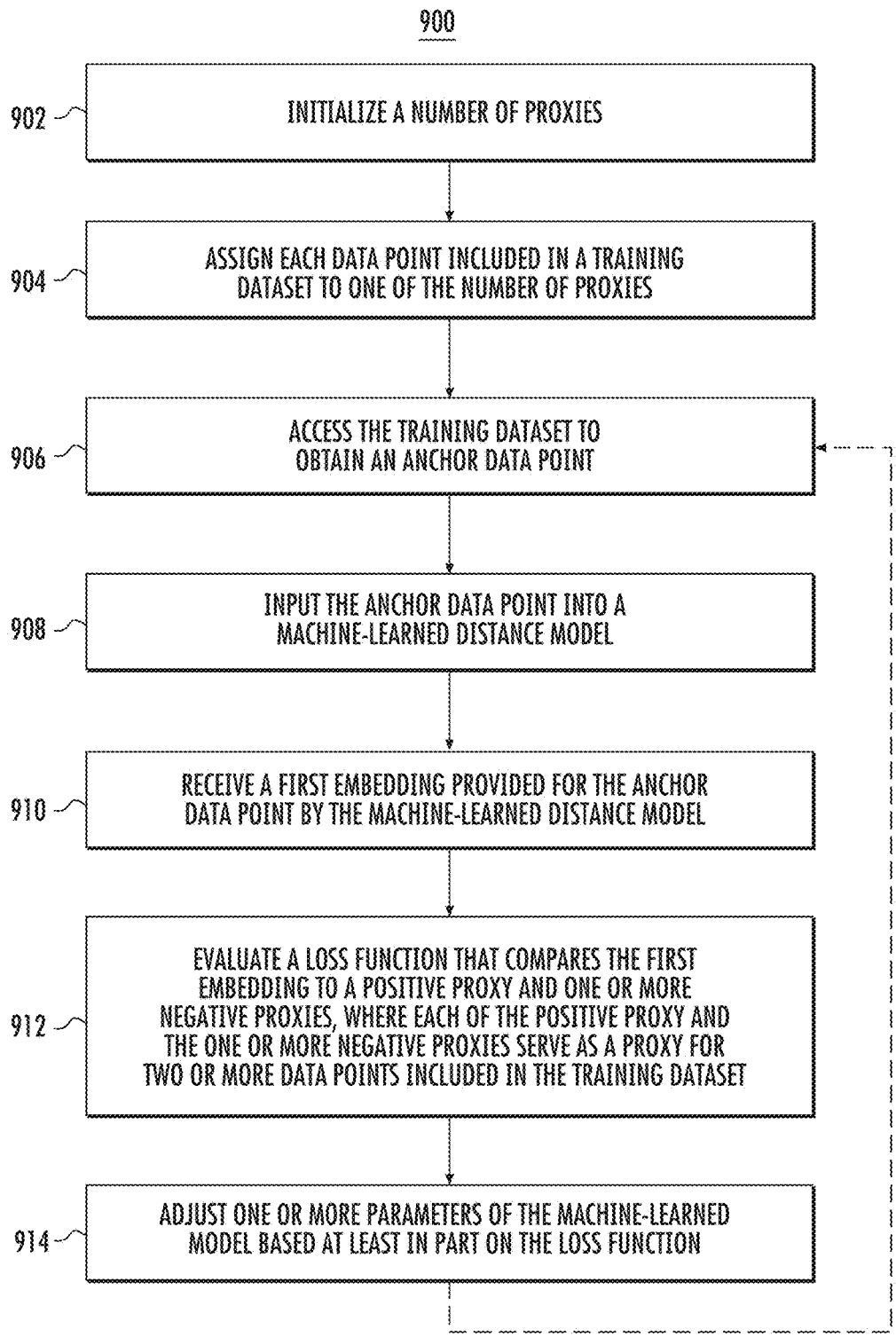
FIG. 9 depicts a flow chart diagram of an example method to perform distance metric learning using proxies according to example embodiments of the present disclosure.
Figure 10:
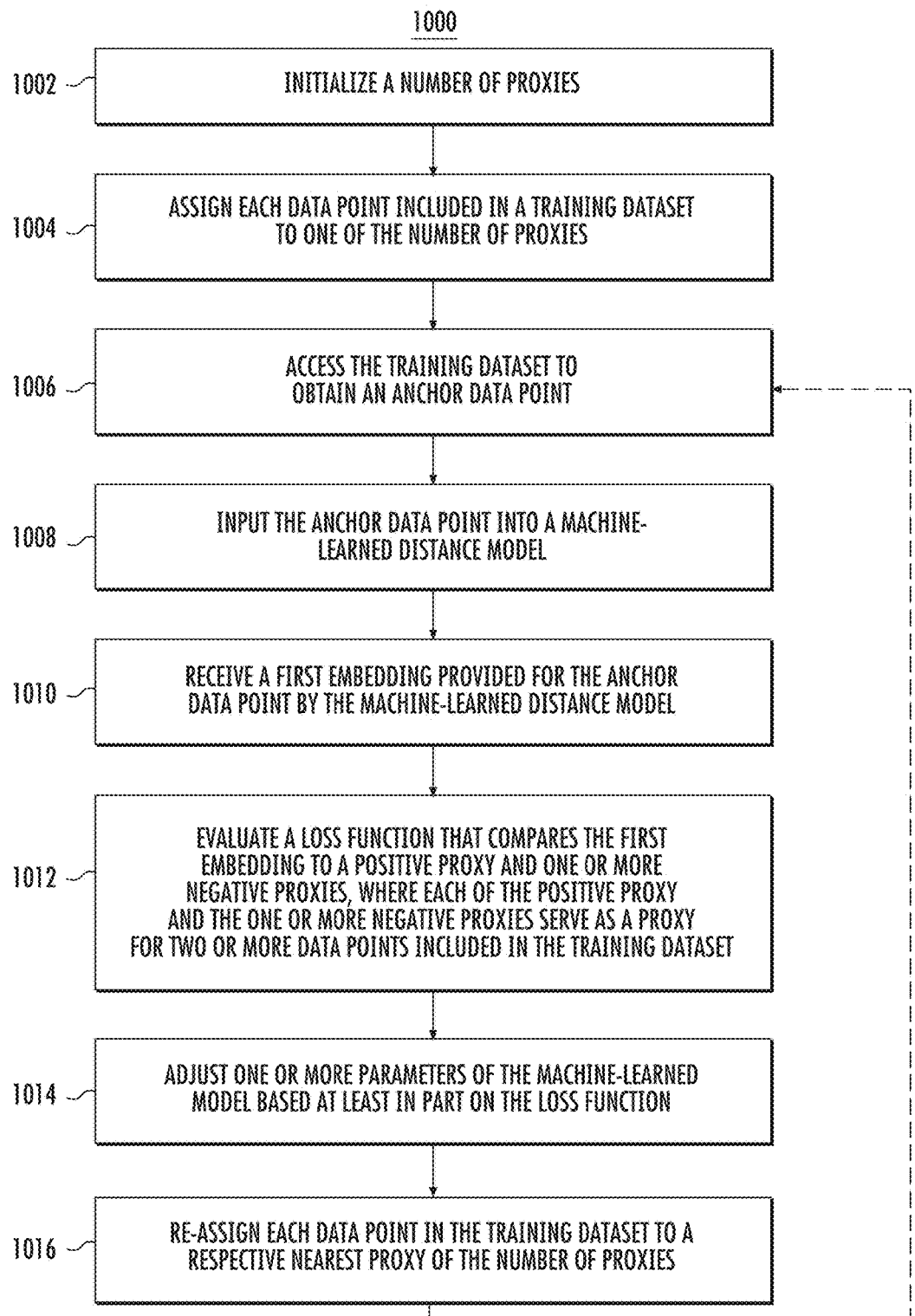
FIG. 10 depicts a flow chart diagram of an example method to perform distance metric learning using proxies according to example embodiments of the present disclosure.

FIGS. 9 and 10 depict flow chart diagrams of example methods 900 and 1000 to perform distance metric learning using proxies according to example embodiments of the present disclosure. In particular, method 900 includes static proxy assignment while method 1000 includes dynamic proxy assignment. While methods 900 and 1000 are discussed with respect to a single training example, it should be understood that they can be performed on a batch of training examples.

Referring first to FIG. 9, at 902 a computing system can initialize a number of proxies. As one example, the number of proxies can be equal to a number of labels or semantic classes associated with a training dataset. As another example, the number of proxies can be at least one-half the number of different labels. However, any number of proxies can be used. In some implementations, the proxies can be initialized at 902 with random values.

At 904, the computing system can assign each data point included in a training dataset to one of the number of proxies. For example, in some implementations, each data point can be assigned to a respective nearest proxy. In some implementations, each data point can have a label or semantic class associated therewith and the data point can be assigned to a proxy that is associated with such label or semantic class.

At 906, the computing system can access the training dataset to obtain an anchor data point. For example, the anchor data point can be randomly selected from the training dataset or according to an ordering or ranking.

At 908, the computing system can input the anchor data point into a machine-learned distance model. As one example, the machine-learned distance model can be a deep neural network.

At 910, the computing system can receive a first embedding provided for the anchor data point by the machine-learned distance model. For example, the embedding can be within a machine-learned embedding dimensional space. For example, the embedding can be provided at a final layer of the machine-learned distance model or at a close to final but not final layer of the machine-learned distance model.

At 912, the computing system can evaluate a loss function that compares the first embedding to a positive proxy and/or one or more negative proxies. One or more of the positive proxy and the one or more negative proxies can serve as a proxy for two or more data points included in the training dataset. For example, the loss function can be a triplet-based loss function (e.g., triplet hinge function loss, NCA, etc.).

As one example, the loss function can compare a first distance between the first embedding and the positive proxy to one or more second distances between the first embedding and the one or more negative proxies. For example, the loss function can compare the first distance to a plurality of second distances respectively between the first embedding and a plurality of different negative proxies (e.g., all negative proxies). For example, the loss function can include a constraint that the first distance is less than each of the one or more second distances (e.g., all of the second distances).

To provide an example, in some implementations, the anchor data point can be associated with a first label; the positive proxy can serve as a proxy for all data points included in the training dataset that are associated with the first label; and the one or more negative proxies can serve as a proxy for all data points included in the training dataset that are associated with at least one second label that is different than the first label. For example, a plurality of negative proxies can respectively serve as proxies for all other labels included in the training dataset.

At 914, the computing system can adjust one or more parameters of the machine-learned model based at least in part on the loss function. For example, one or more parameters of the machine-learned model can be adjusted to reduce the loss function (e.g., in an attempt to optimize the loss function). As one example, the loss function can be backpropagated through the distance model. In some implementations, the loss function can also be backpropagated through a proxy matrix that holds the values of the proxies (e.g., as proxy embedding vectors).

After 914, method 900 returns to 906 to obtain an additional anchor data point. Thus, the machine-learned distance model can be iteratively trained using a number (e.g., thousands) of anchor data points. Since proxies are used, the number of training iterations required to converge over the training dataset is significantly reduced. After training is complete, the machine-learned distance model can be employed to perform a number of different tasks, such as, for example, assisting in performance of a similarity search (e.g., an image similarity search).

Referring now to FIG. 10, at 1002 a computing system can initialize a number of proxies. Any number of proxies can be used. In some implementations, the proxies can be initialized at 1002 with random values.

At 1004, the computing system can assign each data point included in a training dataset to one of the number of proxies. For example, in some implementations, each data point can be assigned to a respective nearest proxy. As another example, the data points can be randomly assigned to the proxies.

At 1006, the computing system can access the training dataset to obtain an anchor data point. For example, the anchor data point can be randomly selected from the training dataset or according to an ordering or ranking.

At 1008, the computing system can input the anchor data point into a machine-learned distance model. As one example, the machine-learned distance model can be a deep neural network.

At 1010, the computing system can receive a first embedding provided for the anchor data point by the machine-learned distance model. For example, the embedding can be within a machine-learned embedding dimensional space. For example, the embedding can be provided at a final layer of the machine-learned distance model or at a close to final but not final layer of the machine-learned distance model.

At 1012, the computing system can evaluate a loss function that compares the first embedding to a positive proxy and/or one or more negative proxies. One or more of the positive proxy and the one or more negative proxies can serve as a proxy for two or more data points included in the training dataset. For example, the loss function can be a triplet-based loss function (e.g., triplet hinge function loss, NCA, etc.).

As one example, the loss function can compare a first distance between the first embedding and the positive proxy to one or more second distances between the first embedding and the one or more negative proxies. For example, the loss function can compare the first distance to a plurality of second distances respectively between the first embedding and a plurality of different negative proxies (e.g., all negative proxies). For example, the loss function can include a constraint that the first distance is less than each of the one or more second distances (e.g., all of the second distances).

At 1014, the computing system can adjust one or more parameters of the machine-learned model based at least in part on the loss function. For example, one or more parameters of the machine-learned model can be adjusted to reduce the loss function (e.g., in an attempt to optimize the loss function). As one example, the loss function can be backpropagated through the distance model. In some implementations, the loss function can also be backpropagated through a proxy matrix that holds the values of the proxies (e.g., as proxy embedding vectors).

At 1016, the computing system re-assigns each data point in the training dataset to a respective one of the number of proxies. For example, at 1016, the computing system can re-assigned each data point in the training dataset to a respective nearest proxy of the number of proxies.

After 1016, method 1000 returns to 1006 to obtain an additional anchor data point. Thus, the machine-learned distance model can be iteratively trained using a number (e.g., thousands) of anchor data points. Since proxies are used, the number of training iterations required to converge over the training dataset is significantly reduced. After training is complete, the machine-learned distance model can be employed to perform a number of different tasks, such as, for example, assisting in performance of a similarity search (e.g., an image similarity search).

10. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 9 and 10 respectively depict steps performed in a particular order for purposes of illustration and discussion, the methods of the present disclosure are not limited to the particularly illustrated order or arrangement. The various steps of the methods 900 and 1000 can be omitted, rearranged, combined, and/or adapted in various ways without deviating from the scope of the present disclosure.

What is claimed is:

1. A computer system to perform distance metric learning using proxies, the computer system comprising:
   a machine-learned distance model configured to receive input data points and, in response, provide respective embeddings for the input data points within an embedding space, wherein a distance between a pair of embeddings provided for a pair of the input data points is indicative of a similarity between the pair of the input data points;
   one or more processors; and
   one or more non-transitory computer readable media that collectively store instructions that, when executed by the one or more processors cause the computer system to perform operations, the operations comprising:

accessing a training dataset that includes a plurality of data points to obtain an anchor data point;

inputting the anchor data point into the machine-learned distance model;

receiving a first embedding provided for the anchor data point by the machine-learned distance model;

evaluating a loss function that compares the first embedding to a positive proxy and one or more negative proxies, wherein each of the positive proxy and the one or more negative proxies serve as a proxy for two or more data points included in the training dataset; and adjusting one or more parameters of the machine-learned distance model based at least in part on the loss function.

2. The computer system of claim 1, wherein the operations further comprise:

adjusting, by the one or more computing devices, one or more of the positive proxy and the one or more negative proxies based at least in part on the loss function.

3. The computer system of claim 2, wherein adjusting, by the one or more computing devices, one or more parameters of the machine-learned distance model and adjusting, by the one or more computing devices, one or more of the positive proxy and the one or more negative proxies comprise jointly backpropagating, by the one or more computing devices, the loss function through the machine-learned distance model and a proxy matrix that includes the positive proxy and the one or more negative proxies.

4. The computer system of claim 1, wherein the loss function compares a first distance between the first embedding and the positive proxy to one or more second distances between the first embedding and the one or more negative proxies.

5. The computer system of claim 4, wherein the loss function compares the first distance to a plurality of second distances respectively between the first embedding and a plurality of different negative proxies.

6. The computer system of claim 4, wherein the loss function includes a constraint that the first distance is less than each of the one or more second distances.

7. The computer system of claim 1, wherein the anchor data point is associated with a first label, wherein the positive proxy serves as a proxy for all data points included in the training dataset that are associated with the first label, and wherein the one or more negative proxies serves as a proxy for all data points included in the training dataset that are associated with at least one second label that is different than the first label.

8. The computer system of claim 1, wherein:

each data point included in the training dataset is associated with one of a number of different labels; and the operations further comprise, prior to inputting the anchor data point:

initializing, by the one or more computing devices, a number of proxies;

respectively associating, by the one or more computing devices, the number of proxies with the number of different labels; and assigning, by the one or more computing devices, each proxy to all data points that are associated with a same label.

9. The computer system of claim 8, wherein the number of proxies is at least one-half the number of different labels.

10. The computer system of claim 2, wherein the operations further comprise, after adjusting, by the one or more computing devices, one or more of the positive proxy and the one or more negative proxies based at least in part on the loss function:

re-assigning, by the one or more computing devices, each data point in the training dataset to a nearest proxy of a plurality of proxies, the plurality of proxies including the positive proxy and the one or more negative proxies.

11. The computer system of claim 1, wherein the machine-learned distance model comprises a deep neural network.

12. The computer system of claim 1, wherein the operations further comprise, after adjusting one or more parameters of the machine-learned distance model based at least in part on the loss function:

employing the machine-learned distance model to perform a similarity search.

13. A computer-implemented method to perform distance metric learning using proxies, the method comprising:

accessing, by one or more computing devices, a training dataset that includes a plurality of data points to obtain an anchor data point;

inputting, by the one or more computing devices, the anchor data point into a machine-learned distance model;

receiving, by the one or more computing devices, a first embedding provided for the anchor data point by the machine-learned distance model;

evaluating, by the one or more computing devices, a loss function that compares the first embedding to one or more of: a positive proxy and one or more negative proxies, wherein one or more of the positive proxy and the one or more negative proxies serve as a proxy for two or more data points included in the training dataset; and adjusting, by the one or more computing devices, one or more parameters of the machine-learned distance model based at least in part on the loss function.

14. The computer-implemented method of claim 13, wherein the method further comprises:

adjusting, by the one or more computing devices, one or more of the positive proxy and the one or more negative proxies based at least in part on the loss function.

15. The computer-implemented method of claim 14, wherein adjusting, by the one or more computing devices, one or more parameters of the machine-learned distance model and adjusting, by the one or more computing devices, one or more of the positive proxy and the one or more negative proxies comprise jointly backpropagating, by the one or more computing devices, the loss function through the machine-learned distance model and a proxy matrix that includes the positive proxy and the one or more negative proxies.

16. The computer-implemented method of claim 13, wherein evaluating, by the one or more computing devices, the loss function comprises evaluating, by the one or more computing devices, the loss function that compares a first distance between the first embedding and the positive proxy to one or more second distances between the first embedding and the one or more negative proxies.

17. The computer-implemented method of claim 16, wherein the loss function includes a constraint that the first distance is less than each of the one or more second distances.

18. The computer-implemented method of claim 13, wherein the anchor data point is associated with a first label, wherein the positive proxy serves as a proxy for all data points included in the training dataset that are associated with the first label, and wherein the one or more negative proxies serves as a proxy for all data points included in the training dataset that are associated with at least one second label that is different than the first label.

19. The computer-implemented method of claim 14, wherein the method further comprises, after adjusting, by the one or more computing devices, one or more of the positive proxy and the one or more negative proxies based at least in part on the loss function:

re-assigning, by the one or more computing devices, each data point in the training dataset to a nearest proxy of a plurality of proxies, the plurality of proxies including the positive proxy and the one or more negative proxies.

20. One or more non-transitory computer-readable media that collectively store instructions that, when executed by one or more processors, cause the one or more processors to perform operations, the operations comprising:

accessing a training dataset that includes a plurality of data points to obtain an anchor data point;

inputting the anchor data point into a machine-learned distance model;

receiving a first embedding provided for the anchor data point by the machine-learned distance model;

evaluating a loss function that compares the first embedding to one or more of: a positive proxy and one or more negative proxies, wherein one or more of the positive proxy and the one or more negative proxies serve as a proxy for two or more data points included in the training dataset; and adjusting one or more parameters of the machine-learned distance model based at least in part on the loss function.

* * * * *